W. YOUNG.
Stops for Water-Main Attachments.
No. 137,399. Patented April 1, 1873.
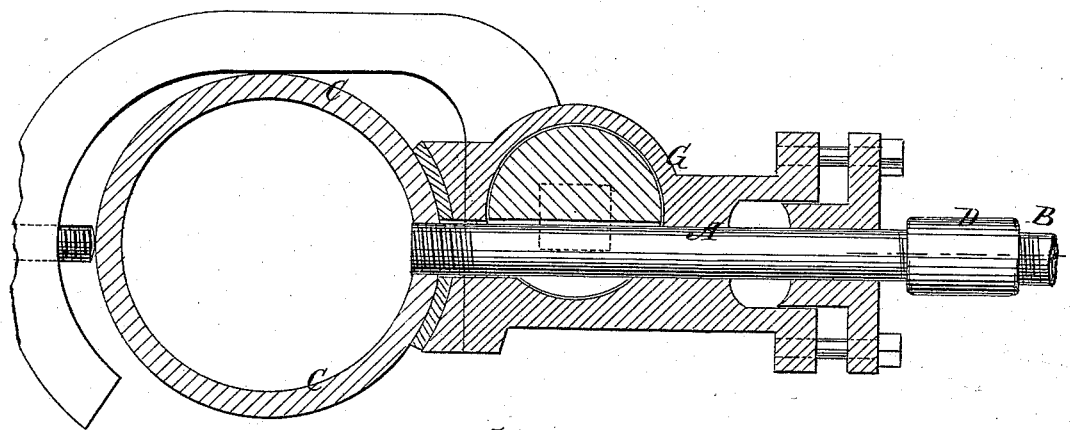
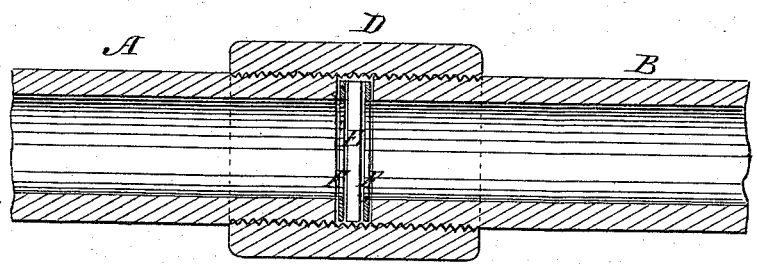

UNITED STATES PATENT OFFICE.

WILLIAM YOUNG, OF EASTON, PENNSYLVANIA.

IMPROVEMENT IN STOPS FOR WATER-MAIN ATTACHMENTS.

Specification forming part of Letters Patent No. 137,399, dated April 1, 1873; application filed February 8, 1873.

*To all whom it may concern:*

Be it known that I, WILLIAM YOUNG, of Easton, in the county of Northampton and State of Pennsylvania, have invented a new and Improved Temporary Stop for Water-Main Attachments, of which the following is a specification:

For attaching service-pipes to water-mains with the pressure on it has been the custom up to this time to screw in a short section of pipe with a stop-cock in it to hold back the water until the service-pipe connection was completed, when the cock was opened and the water allowed to flow. These cocks are quite expensive, and it is desirable to have a cheaper stop for keeping the water back until the connection is made, which I propose to furnish by having the pipe-connection to be attached to the main consist of two sections coupled together by a union, with a disk of glass or any substance that will break readily by a crushing force, and packing-washers between the two sections, which will stop the water until the connection is made, and then let it flow by screwing up one section against the other hard enough to break the glass.

Figure 1 is a section of a water-main and a kind of trap used to prevent the escape of the water while tapping the main and inserting the pipe, also a side elevation of the said pipe; and Fig. 2 is a sectional elevation of a section of pipe to be attached with my improved temporary stop applied.

Similar letters of reference indicate corresponding parts.

A and B represent the two sections of the pipe to be attached to the water-main C. D represents the union by which they are connected together. E is the glass disk between the ends of the sections for stopping the water, and F the packing-gaskets, of rubber or other suitable substance to make a tight joint. The section A is screwed into the water-main, while the trap G is clamped on it to prevent the escape of the water while drilling the hole and screwing in the said section, and the disk of glass prevents the escape of water through the pipe. The service-pipe is then attached to the section B, and then the glass is broken by screwing the section B up hard, which allows the water to flow, the pieces being washed out through the pipes. Two or more disks of glass may be used, according to the strength required. Thus I avoid the use of the expensive cocks heretofore employed for this purpose, and of necessity left in the pipes, where they are of no further use.

The traps G are in practice made in two parts, so that they can be taken apart to be removed from the pipes A.

Having thus described my invention, I claim as new and desire to secure by Letters Patent—

A temporary stop for pipes to be attached to water-mains under pressure, consisting of two sections, A B, a union, D, glass or equivalent disk E, and packing-washers, combined substantially as specified.

WILLIAM YOUNG.

Witnesses:
 NELSON HOYT, Jr.,
 CHARLES S. KNAUSS.